US012153358B2

(12) United States Patent
Nguyen

(10) Patent No.: US 12,153,358 B2
(45) Date of Patent: Nov. 26, 2024

(54) TONER CONTAINER AND IMAGE FORMING APPARATUS

(71) Applicant: KYOCERA Document Solutions Inc., Osaka (JP)

(72) Inventor: Danh Chien Nguyen, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/330,961

(22) Filed: Jun. 7, 2023

(65) Prior Publication Data

US 2023/0400793 A1 Dec. 14, 2023

(30) Foreign Application Priority Data

Jun. 10, 2022 (JP) ................................ 2022-094280
Jun. 10, 2022 (JP) ................................ 2022-094282

(51) Int. Cl.
*G03G 15/08* (2006.01)

(52) U.S. Cl.
CPC ... *G03G 15/0875* (2013.01); *G03G 2215/068* (2013.01)

(58) Field of Classification Search
CPC ........... G03G 15/0875; G03G 15/0881; G03G 15/0886; G03G 2215/068; G03G 2215/0668
See application file for complete search history.

(56) References Cited

U.S. PATENT DOCUMENTS 5,455,662 A * 10/1995 Ichikawa ........... G03G 15/0855 141/357
6,219,506 B1 * 4/2001 Morinaga ............ G03G 21/181 399/119
7,486,905 B2 2/2009 Nishimura et al.
8,244,154 B2 8/2012 Ito et al.
2006/0171737 A1 * 8/2006 Nishimura ........... G03G 21/181 399/109

FOREIGN PATENT DOCUMENTS

JP 2006-208837 A 8/2006
JP 2010-096828 A 4/2010

* cited by examiner

*Primary Examiner* — Thomas S Giampaolo, II
(74) *Attorney, Agent, or Firm* — Studebaker & Brackett PC

(57) ABSTRACT

A toner container includes a container body, a cylindrical portion and a cap. The container body has a toner filling port. The cylindrical portion is provided around the filling port. The cap is detachable and closes an opening of the cylindrical portion. The cap includes: claw parts provided deformably and insertable into the cylindrical portion to be engaged with an edge of the filling port; a link piece connecting tip ends of the claw parts; a disk part having an opening; a closing plate capable of closing the opening of the disk part; and a fixing member which fixes the closing plate to the disk part. The closing plate is fixed to the disk part with the fixing member and the claw parts are engaged with the edge of the filling opening, so that the opening of the cylindrical is closed by the closing plate.

7 Claims, 7 Drawing Sheets

TONER CONTAINER AND IMAGE FORMING APPARATUS

INCORPORATION BY REFERENCE

This application is based on and claims the benefit of priority from Japanese patent applications No. 2022-094280 filed on Jun. 10, 2022 and No. 2022-094282 filed on Jun. 10, 2022, which is incorporated by reference in its entirety.

BACKGROUND

The present disclosure relates to a reusable toner container and an image forming apparatus including the toner container.

In recent years, there has been a growing trend to reuse a toner container in an electrophotographic image forming apparatus that use toner, such as a multifunctional peripheral and a printer.

For example, a developer cartridge (corresponding to the toner container) is configured such that a cylindrical toner filling port is closed by a cap. When the developer cartridge is reused, a part of the toner filling port is cut off together with the cap, and then another cap is inserted into the toner filling port to close the toner filling port. Alternatively, the toner container may also be configured such that the flange portion of the cap is adhered to the tip surface of the cylindrical filling port. When the toner container is reused, the cap including the flange portion is cut off together with the filling port, and then the flange portion of another cap is adhered to the tip surface of the filling port.

However, in the above toner containers, However, in the above toner container, the cap after cutting off is not reusable, and much of it is discarded. In addition, since the strength and rigidity of the container body are reduced by cutting off the filling port, the number of times the container body can be reused is limited.

SUMMARY

A toner container according to the present disclosure includes a container body, a cylindrical portion and a cap. The container body has a toner filling port. The cylindrical portion is provided around the filling port. The cap is detachable and closes an opening of the cylindrical portion. The cap includes: a pair of claw parts provided deformably in a radial direction of the cylindrical portion and insertable into the cylindrical portion to be engaged with an edge of the filling port; a link piece connecting tip ends of the claw parts; a disk part having an opening; a closing plate capable of closing the opening of the disk part; and a fixing member which fixes the closing plate to the disk part. The closing plate is fixed to the disk part with the fixing member and the claw parts are engaged with the edge of the filling opening, so that the opening of the cylindrical portion is closed by the closing plate. The closing plate is detached from the disk part by detaching the fixing member, the link piece is pulled through the opening of the disk part to deform the claw parts radially inward to release engagement of the claw parts with the edge of the filling port, and then the cap is detached from the cylindrical portion, so that the container body and the cap can be reused.

An image forming apparatus according to the present disclosure includes the toner container; and an image forming part which forms an image using the toner supplied from the toner container.

The objects, features, and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Hereinafter, with reference to the attached drawings, an image forming apparatus and a toner container according to one embodiment in the present disclosure will be described.

Figure 1:
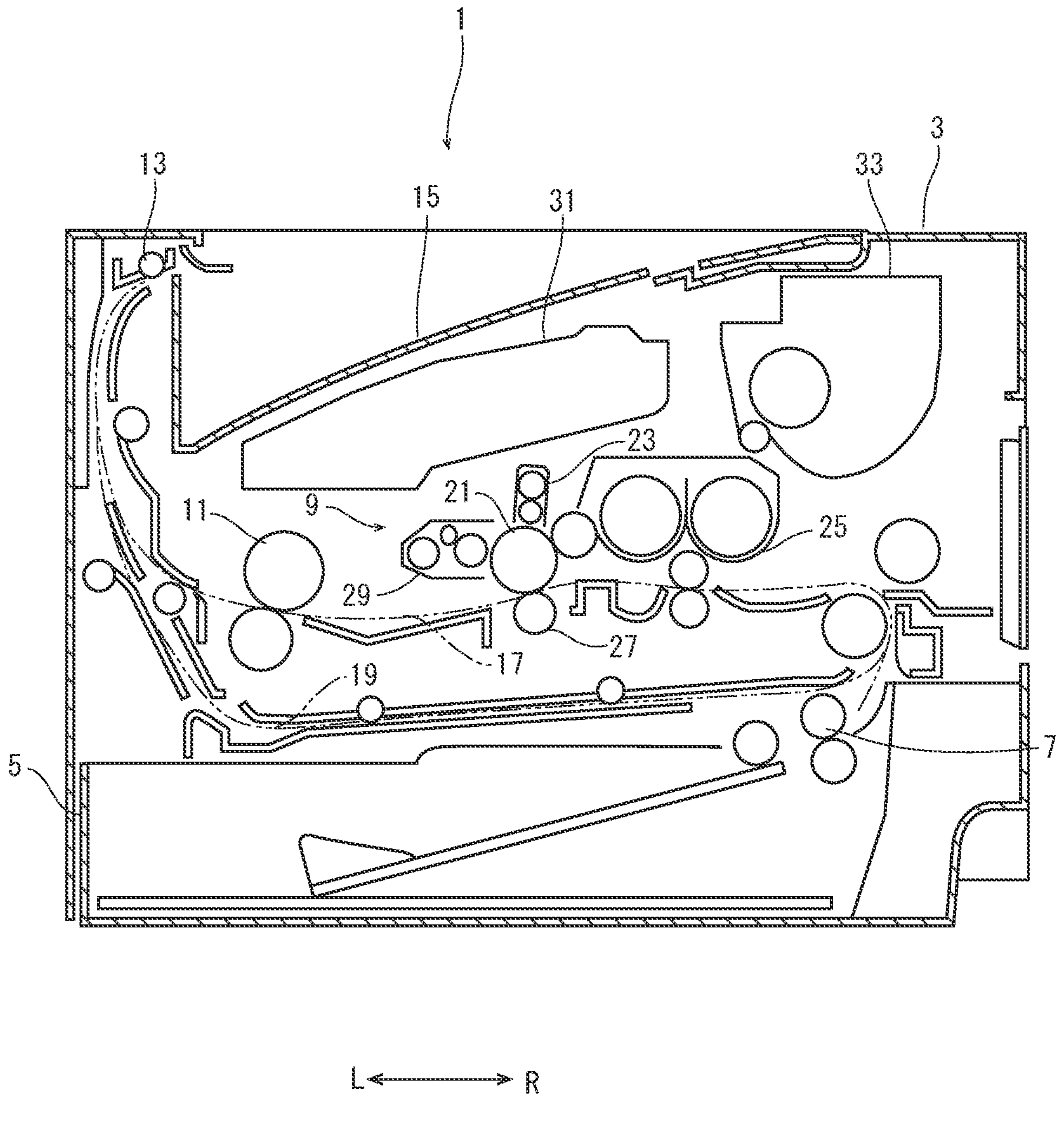
FIG. 1 is a front view schematically showing an inner structure of an image forming apparatus according to one embodiment of the present disclosure.

First, with reference to FIG. 1, an image forming apparatus 1 will be described. FIG. 1 is a front view schematically showing the inner structure of the image forming apparatus 1. Fr, Rr, L and R in each figure indicate the front, rear, left and right sides of the image forming apparatus 1, respectively.

The image forming apparatus 1 includes a hollow housing 3 having a nearly parallelepiped shape. Inside the housing 3, a sheet feeding cassette 5 in which a sheet is stored, a sheet feeding device 7 which feeds the sheet from the sheet feeding cassette 5, an image forming part 9 which forms a toner image on the sheet, a fixing device 11 which fixes the toner image on the sheet, and a discharging device 13 which discharges the sheet are housed. On the upper surface of the housing 3, a sheet discharge tray 15 on which the discharged sheet is stacked is formed. Further, a conveyance path 17 is formed inside the housing 3, along which the sheet is conveyed from the sheet feeding device 7 to the discharging device 13 through the image forming part 9 and the fixing device 11. Furthermore, inside the housing 3, an inversion path 19 is formed, which is branched from the conveyance path 17 on the downstream side of the fixing device 11 and merged with the conveyance path 17 on the upstream side of the image forming part 9.

The image forming part 9 includes a rotatable photosensitive drum 21, a charging device 23, a developing device 25, a transferring roller 27 and a cleaning device 29 which are arranged around the photosensitive drum 21 along the rotation direction of the photosensitive drum 21, an exposure device 31 and a toner container 33. A transfer nip is formed between the photosensitive drum 21 and the transferring roller 27. The toner container 33 is connected to the developing device 25, and toner is supplied from the toner container 33 to the developing device 25.

The image forming operation is briefly described. The sheet fed from the sheet feeding cassette 5 by the sheet feeding device 7 is conveyed along the conveyance path 17 to the image forming part 9. In the image forming part 9, the charging device 23 charges the surface of the photosensitive drum 21. The exposure device 31 exposes the surface of the photosensitive drum 21 charged by the charging device 23, and forms an electrostatic latent image corresponding to image data on the surface of the photosensitive drum 21. The developing device 25 develops the electrostatic latent image on the photosensitive drum 21 into a toner image using the toner supplied from the toner container 33. The transferring roller 27 transfers the toner image onto the sheet conveyed to the transfer nip along the conveyance path 17. The sheet on which the toner image is transferred is conveyed along the conveyance path 17 to the fixing device 11. The cleaning device 29 removes the toner remaining on the surface of the photosensitive drum 21 after the transferring. In the fixing device 11, the toner image is fixed on the sheet. The sheet on which the toner image is fixed is discharged to the sheet discharge tray 15 by the discharging device 13.

In the case of duplex printing, the sheet with the toner image fixed on one side by the fixing device 11 is switched back in the conveyance path 17, and then conveyed to the inversion path 19. Then, the sheet is conveyed from the inversion path 19 to the conveyance path 17, and then the toner image is formed on the other side of the sheet by the image forming part 9 and fixed on the other side by the fixing device 11. The sheet with the toner images fixed on both the sides in this way is discharged to the sheet discharge tray 15 by the discharging device 13.

Figure 2:
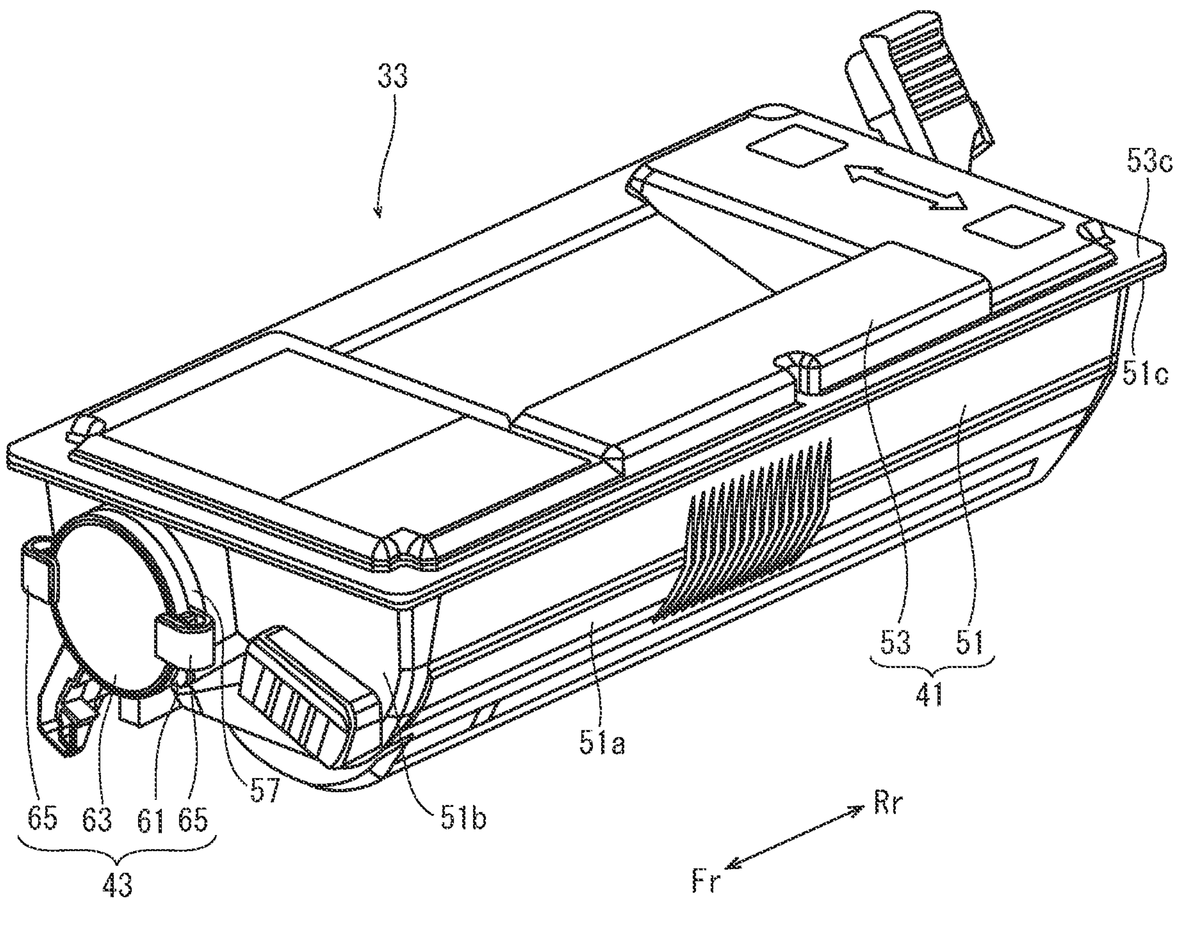
FIG. 2 is a perspective view showing a toner container according to the embodiment of the present disclosure.

Next, the toner container 33 will be described with reference to FIG. 2 and FIG. 3. FIG. 2 is a perspective view showing the toner container 33, and FIG. 2B is a disassembled perspective view showing the toner container 33.

The toner container 33 includes a container body 41 having a toner filling port 43 (see FIG. 3), and a cap 45 closing the filling port 43.

As shown in FIG. 2, the container body 41 has a body part 51 with the upper surface opened and a lid part 53 with the lower surface opened. The body part 51 has an approximately half-cylindrical bottom plate 51*a* long in the front-and-rear direction and approximately semi-circular front and rear side plate 51*b*. The body part 51 is formed with a flange 51*c* extending outward around the upper surface opening. The lid part 53 is formed with a flange 53*c* extending outward around the lower surface opening. When both the flanges 51*c* and 53*c* are welded together, the body part 51 and the lid part 53 constitute the container body 41 having an inner space for storing the toner.

Figure 3:
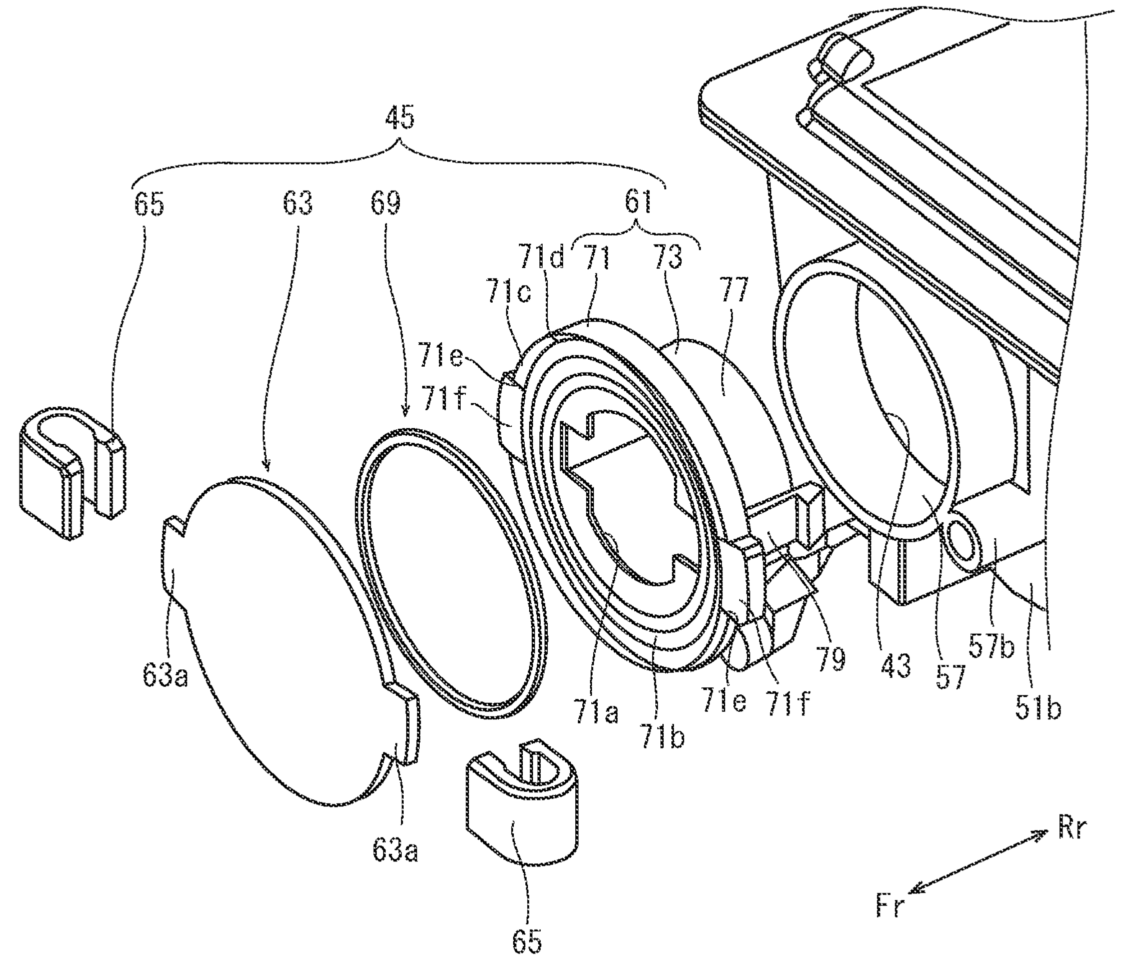
FIG. 3 is a disassembled perspective view showing a cap of the toner container according to the embodiment of the present disclosure.

As shown in FIG. 3, 1*n* one side plate 51*b*, the toner filling port 43 is formed. In addition, in the side plate 51*b*, a cylindrical portion 57 is formed around the filling port 43. A groove 57*a* (not shown in FIG. 2 and FIG. 3, see FIG. 4B) is formed on the tip surface of the cylindrical portion 57 along the circumferential direction. In addition, a positioning projection 57*b* positioned with the cap 45 is formed on the outer circumferential surface of the cylindrical portion 57.

In the inner space of the container body 41, a stirring paddle and a conveying screw (both not shown) are rotatably housed. Furthermore, a toner discharge port (not shown) is formed on the bottom plate 51*a* of the body part 51. The discharge port communicates with the toner supply port (not shown) of the developing device 25. The discharge port can be opened and closed by means of a shutter (not shown).

Figure 4A:
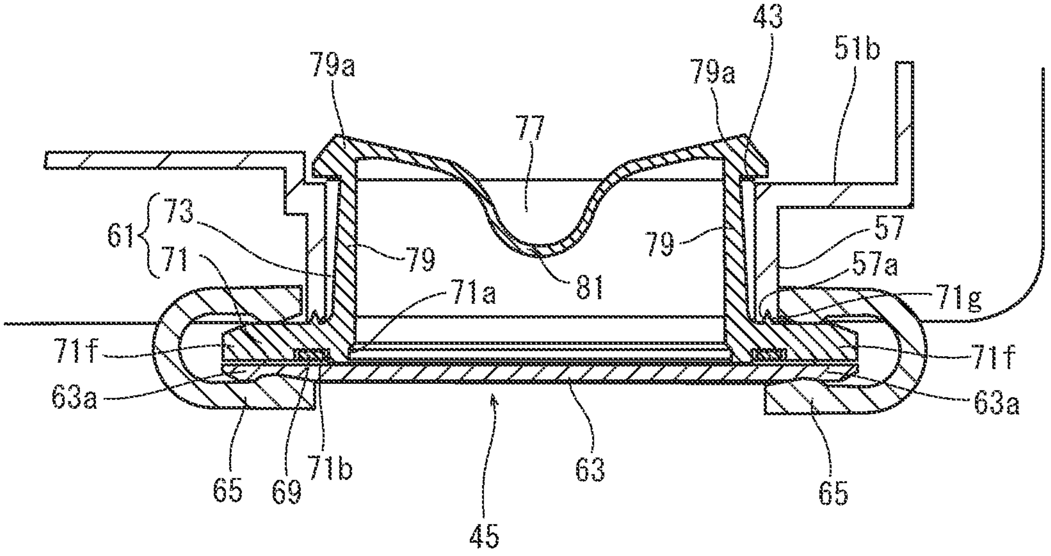
FIG. 4A is a sectional view showing the cap of the toner container according to the embodiment of the present disclosure.
Figure 4B:
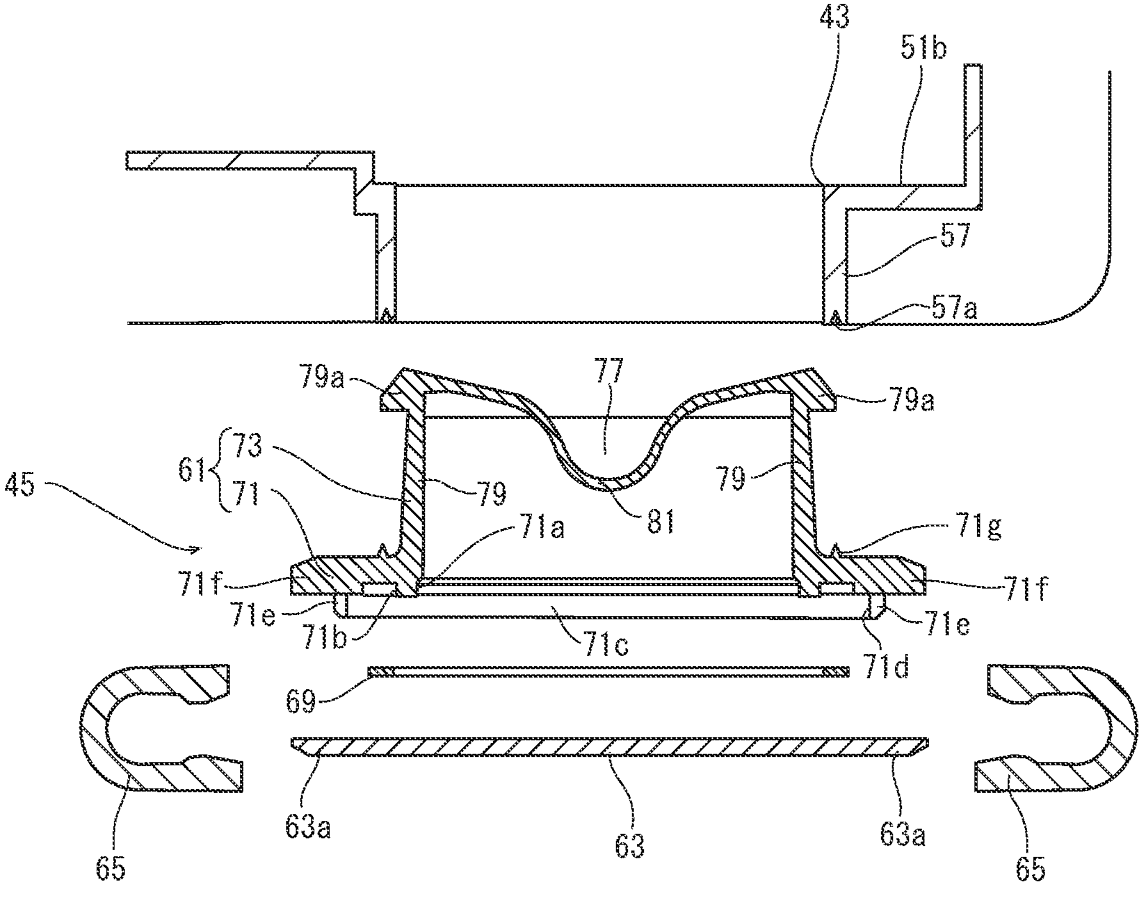
FIG. 4B is a disassembled sectional view showing the cap of the toner container according to the embodiment of the present disclosure.
Figure 5:
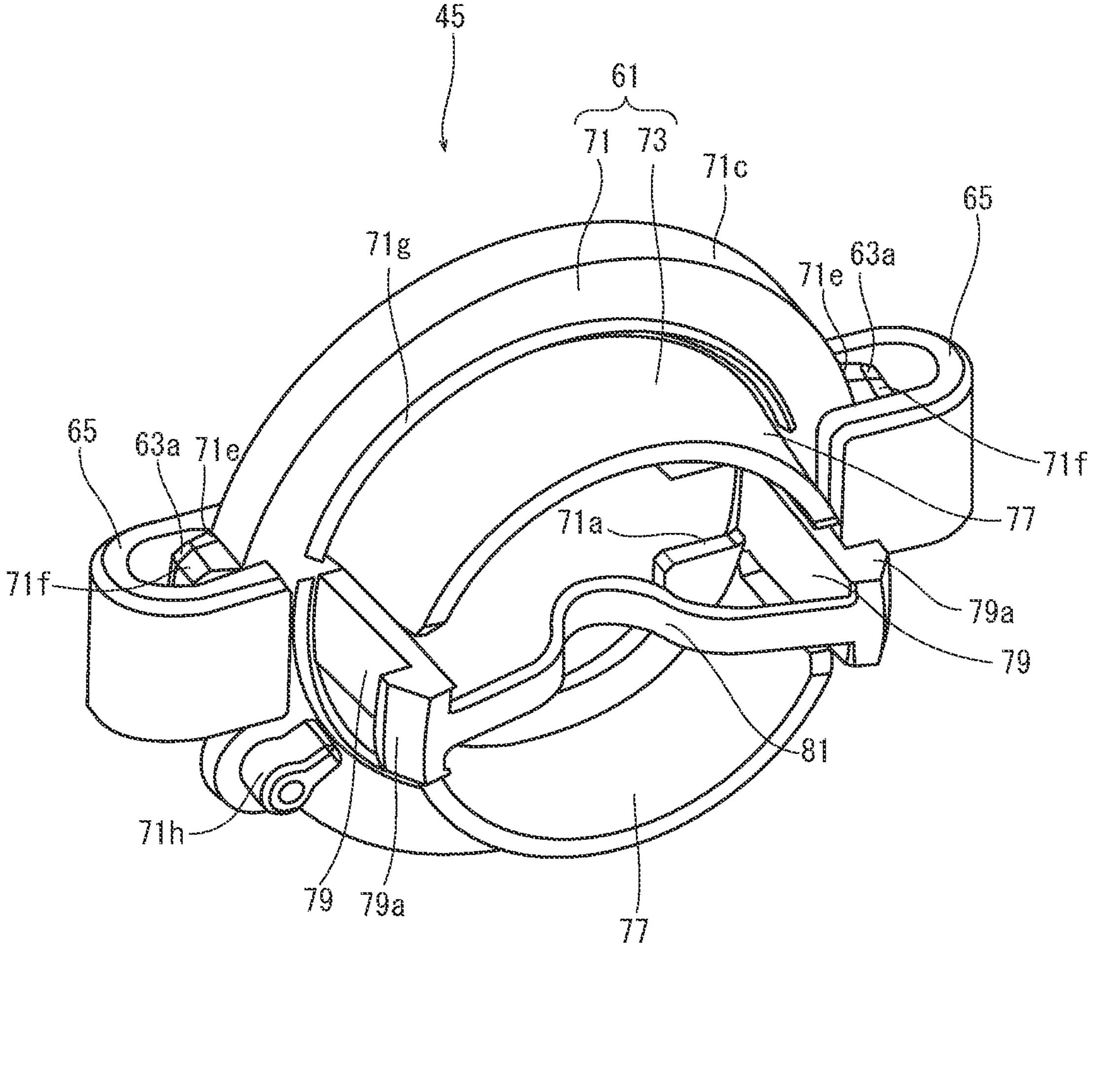
FIG. 5 is a perspective view showing the cap of the toner container according to the embodiment of the present disclosure.

Next, the cap 45 will be described with reference to FIG. 3, FIG. 4A and FIG. 4B, and FIG. 5. FIG. 4A and FIG. 4B are sectional views showing the cap 45, and FIG. 5 is a perspective view showing the cap 45. The cap 45 includes a cylindrical body 61 attached to the cylindrical portion 57 of the container body 41, a closing plate 63 which closes the opening of the cylindrical portion 57, and a pair of clips 65 which fixes the cylindrical body 61 and the closing plate 63. The cap 45 is made of resin.

The cylindrical body 61 has a disk part 71 whose outer diameter is larger than that of the cylindrical portion 57 of the container body 41, and a cylindrical insertion part 73 which is integrally provided with the disk part 71 and can be inserted into the cylindrical portion 57. An approximately cross-shaped opening 71*a* is formed in the center of the disk part 71. The front surface of the disk part 71 is formed to be flat. As shown in FIG. 3, an annular groove 71*b* is formed around the opening 71*a* on the front surface of the disk part 71. An O-ring 69 is fitted into the groove 71*b*. In addition, a side wall 71*c* is formed on the front surface around the outer circumferential edge. As a result, a recess 71*d* surrounded by the side wall 71*c* is formed on the front surface of the disk part 71 On the side wall 71*c*, a pair of notches 71*e* are formed diagonally. Furthermore, projecting pieces 71*f* projecting outward are formed on the outside of both the notches 71*e*. As shown in FIG. 5, an annular rib 71*g* concentric with the disk part 71 is formed around the opening 71*a* on the rear surface of the disk part 71. In addition, a positioning pin 71*h* is provided on the rear surface of the disk part 71.

The insertion part 73 is formed between the opening 71*a* on the rear surface of the disk part 71 and the annular rib 71*g* so as to be concentric with the disk part 71. As can be clearly seen in FIG. 5, the insertion part 73 has a pair of radially facing half-cylindrical parts 77 and a pair of radially facing claw parts 79. The outer circumferential surfaces of the half-cylindrical parts 77 are inclined radially inward from the base end side (the side of the disk part 71) to the tip end side (the side opposite to the disk part 71). The maximum outer diameter of the half-cylindrical parts 77 is approximately the same as the inner diameter of the cylindrical portion 57 of the container body 41. In addition, the length of the half-cylindrical parts 77 is approximately the same as the length of the cylindrical portion 57. At the tip end portions of the claw parts 79, claws 79*a* protruding radially outward are formed. The outer surface of each claw 79*a* is tapered toward the tip end side. The space between the claws 79*a* of the pair of claw parts 79 in the radial direction is larger than the inner diameter of the cylindrical portion 57 of the container body 41. The length of the claw parts 79 is longer than the length of the cylindrical portion 57 by the length of the claws 79*a*. The length of the claw parts 79 is 10 mm, in one example.

The tip ends of the claw parts 79 are connected by a link piece 81. The link piece 81 is curved in a U-shape on the base end side of the claw parts 79. By pulling the link piece 81 toward the disk part 71, the claw parts 79 are deformable radially inward. The space between the claws 79*a* of the claw parts 79 can be shortened by the radial inward deformation of the claw parts 79.

The closing plate 63 is formed in a disk shape that can be attached to the recess 71*d* of the disk part 71 of the cylindrical body 61. On the side surface of the closing plate 63, a pair of projecting pieces 63*a* are formed diagonally. The closing plate 63 is positioned with respect to the disk part 71 by engaging the projecting pieces 63*a* with the notches 71*e* of the side wall 71*c* of the disk part 71, and is placed in the recess 71*d* of the disk part 71.

Each of the clips 65 has a U-shaped cross section, and is elastically deformable to open between both the end portions. The clips 65 hold the projecting pieces 71*f* of the disk part 71 of the cylindrical body 61 and the projecting pieces 63*a* of the closing plate 63 disposed in the recess 71*d* of the disk part 71. As a result, the closing plate 63 is fixed to the cylindrical body 61, and the opening 71*a* of the disk part 71 is closed by the closing plate 63. Thus, the pair of clips 65 is an example of a fixing member which fixes the closing plate 63 to the disk part 71.

In the assembly order of the cap 45, first, the O-ring 69 is fitted into the groove 71*b* of the cylindrical body 61. Then, the closing plate 63 is attached in the recess 71*d* of the disk part 71 of the cylindrical body 61, and the projecting pieces 71*f* of the disk part 71 and the projecting pieces 63*a* of the closing plate 63 are fixed by the clips 65. Thus, the 69 seals between the closing plate 63 and the disk part 71.

Figure 6A:
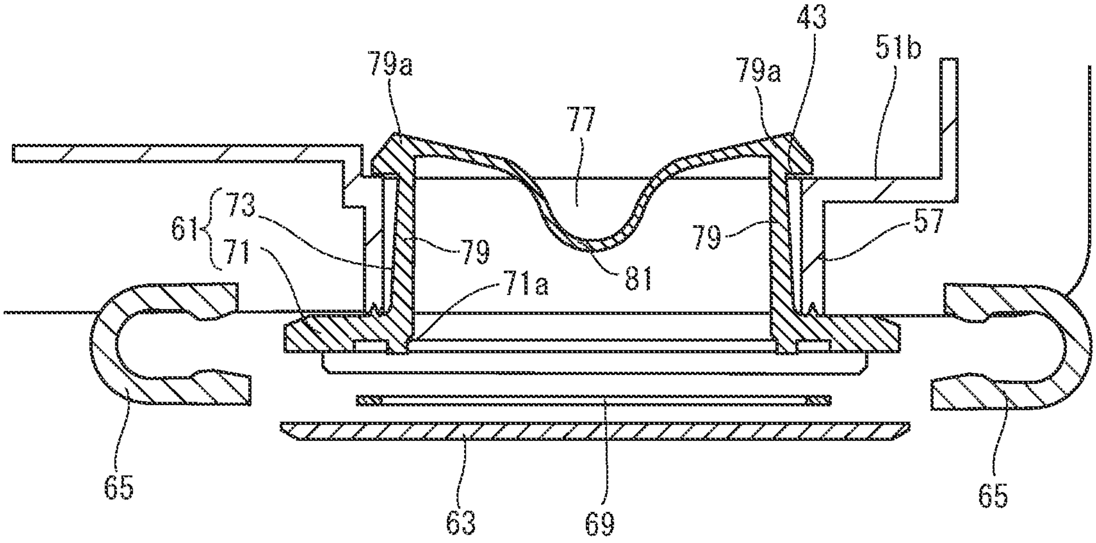
FIG. 6A is a sectional view showing the cap in which a clip is detached, in the toner container according to the embodiment of the present disclosure.
Figure 6B:
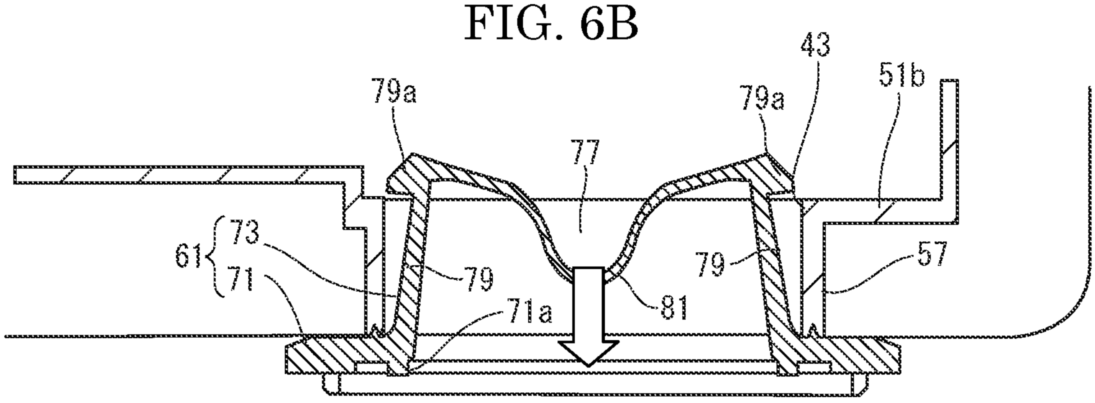
FIG. 6B is a sectional view showing the cap in which a link piece is pulled, in the toner container according to the embodiment of the present disclosure.
Figure 6C:
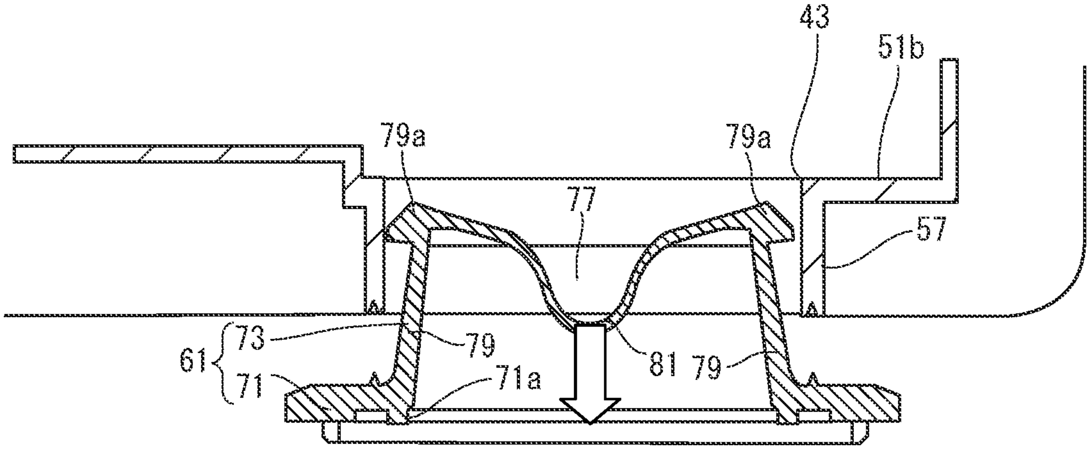
FIG. 6C is a sectional view showing the cap during detachment, in the toner container according to the embodiment of the present disclosure.
Figure 7:
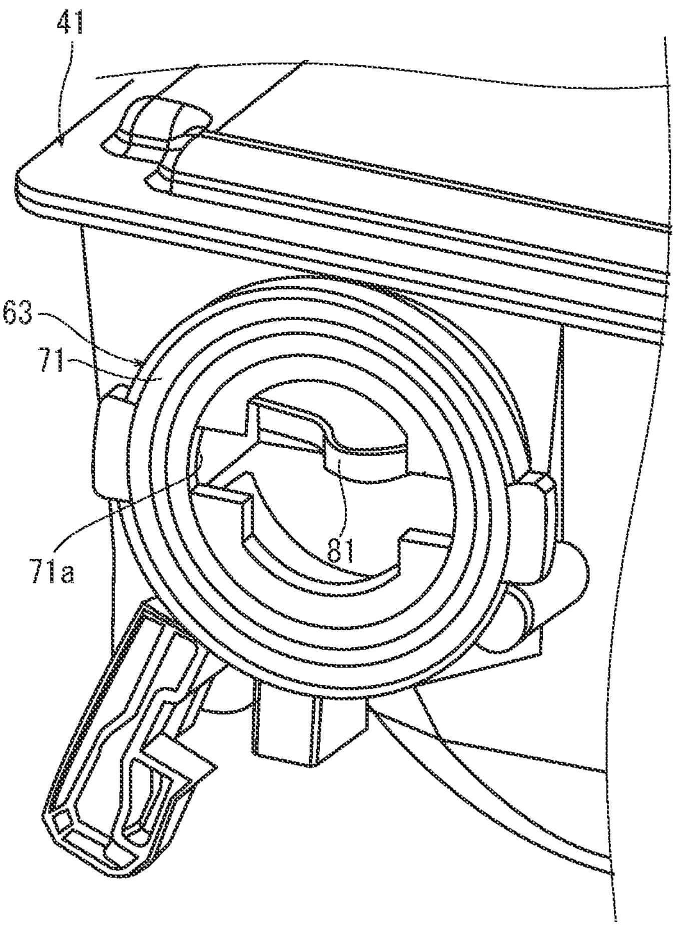
FIG. 7 is a perspective view showing the cap in which a closing plate is detached, in the toner container according to the embodiment of the present disclosure.

The reuse method of the toner container 33 having the above configuration will be described with reference mainly to FIG. 6A to 6C and FIG. 7. FIG. 6A to 6C are sectional views showing the cap 45, and FIG. 7 is a perspective view showing the cap 45. When the toner is filled for the initial time (the first time), the container body 41 is filled with a predetermined amount of the toner through the filling port 43. Then, the cylindrical portion 57 (the filling port) is then closed with the cap 45 assembled as described above.

First, the cap 45 is positioned with respect to the cylindrical portion 57 such that the positioning pin 71*h* of the disk part 71 of the cap 45 faces the positioning projection 57*b* of the cylindrical portion 57 of the container body 41, and then the insertion part 73 of the cylindrical body 61 of the cap 45 is inserted into the cylindrical portion 57. As described above, since the space between the claws 79*a* of the claw parts 79 of the insertion part 73 is larger than the inner diameter of the cylindrical portion 57, the inclined outer surface of each claw 79*a* comes into contact with the edge of the opening of the cylindrical portion 57, and as the insertion part 73 is inserted into the cylindrical portion 57, the claw parts 79 elastically deforms inward in the radial direction. The claw parts 79 remain elastically deformed, and each claw 79*a* slides along the inner circumferential surface of the cylindrical portion 57.

When the insertion part 73 is inserted into the cylindrical portion 57 and the claws 79*a* of the claw parts 79 protrude from the filling port 43 of the container body 41 into the inner space of the container body 41, the claw parts 79 elastically deform radially outward to be engaged with the edge of the filling port 43 (see FIG. 4A). Thus, the claws 79*a* are snap-fit coupled to the edge of the filling port 43. Furthermore, the rear surface of the disk part 71 abuts on the tip surface of the cylindrical portion 57, and the annular rib 71*g* formed on the rear surface of the disk part 71 is fitted into the groove 57*a* formed on the tip surface of the cylindrical portion 57. Thus, the opening of the cylindrical portion 57 is closed by the cap 45, and the cap 45 is attached to the container body 41 (see FIG. 4A). The toner container 33 is shipped in this state.

After the first shipment, the toner container 33 is mounted in a predetermined position inside the housing 3, and the image forming operation described above is performed. When the toner concentration of the developing device 25 drops below the predetermined concentration during the image forming operation, the replenishment operation is performed such that the toner is replenished from the toner container 33 to the developing device 25. In the toner replenishment operation, the stirring paddle and the conveying screw rotate and the shutter is opened. As the stirring paddle rotates, the toner in the container body 41 is stirred and conveyed toward the conveying screw. Then, the toner is conveyed toward the discharge port by the rotation of the conveyance screw, and supplied to the developing device 25 through the discharge port. When the toner concentration in the developing device 25 reaches the predetermined concentration, the supply of toner is stopped. When such a replenishment operation is repeated and the toner in the container body 41 is consumed, the replacement of the toner container 33 is instructed and the toner container 33 is replaced.

When the toner container 33 is replaced, the toner container 33 is detached from the housing 3. Then, as shown in FIG. 6A, the clips 65 are detached to detach the closing plate 63 from the cylindrical body 61, and further, the O-ring 69 is detached from the cylindrical body 61. This exposes the inside of the cylindrical portion 57 and the inner space of the container body 41 through the opening 71*a* of the disk part 71 of the cylindrical body 61, as shown in FIG. 7. That is, the link piece 81 and the claw parts 79 which enter the inside of the cylindrical portion 57 and the inner space of the container body 41 are exposed through the opening 71*a*.

Then, as shown in FIG. 6B, a finger or tool is inserted into the cylindrical portion through this opening 71*a*, and the link piece 81 is pulled outward (see arrow in FIG. 6B). Then, the engagement between the claws 79*a* and the edge of the filling port 43 is released (the snap-fit coupling is released), and the cylindrical body 61 can be detached from the container body 41. After disengaging them in this way, as shown in FIG. 6C, the cylindrical body 61 is pulled out of the cylindrical portion 57 by holding the link piece 81 (see the arrow in FIG. 6C). After detaching the cylindrical body 61 in this way, the inner space of the container body 41 is cleaned by air blowing.

Also, the detached cylindrical body 61, the closing plate 63, the clips 65 and the O-ring 69 are assembled into the cap 45 in the aforementioned assembly order.

Then, as in the first filling, a predetermined amount of the toner is filled into the container body 41 from the filling port 43. Then, the assembled cap 45 is mounted on the cylindrical portion 57 as described above.

As is clear from the above description, according to the present disclosure, when the toner container 33 is reused, the container body 41 and the cap 45 (the cylindrical body 61, the closing plate 63, the clips 65 and the O-ring 69) can be reused. In addition, the container body 41 does not need to be cut or worked for reuse. Furthermore, by engaging the claw parts 79 of the cap 45 with the edge of the filling port 43 of the container body 41, the filling port 43 (the opening of the cylindrical portion 57) can be securely closed without applying a heavy load on the container body 41 (especially, the cylindrical portion 57). That is, since the edge of the filling port 43 is formed at the corner of the side plate 51*b* and the cylindrical portion 57 of the body part 51 of the container body 41 and has high rigidity, the edge is hardly deformed even if the claws 79*a* are engaged with the edge. In order to securely close the filling port 43 (the opening of the cylindrical portion 57) with the cap 45, a large load may be applied to the container body 41 (especially, the cylindrical portion 57) if the cap 45 is made to come into tight close to the cylindrical portion 57. In this case, the container body 41 becomes easily deformed or damaged, making reuse impossible. In this disclosure, since the container body 41 is hard to deform, the container body 41 can be reused multiple times.

In addition, since the cylindrical portion 57 is formed around the filling port 43 of the container body 41 and the claw parts 79 are configured to be engaged with the edge of the filling port 43, the length of the claw parts 79 can be lengthened by the length of the cylindrical portion 57. Thus, the claw parts 79 can be stably elastically deformed.

Instead of the pair of clips 65, an annular elastic member may be used to fix the closing plate 63 and the disk part 71.

While this disclosure has been described for specific embodiment (s), this disclosure is not limited to the above. To the extent that it does not deviate from the scope and spirit of this disclosure, a person skilled in the art may modify the above embodiment.

The invention claimed is:

1. A toner container comprising:

a container body having a toner filling port;

a cylindrical portion provided around the filling port; and a detachable cap that closes an opening of the cylindrical portion, wherein the cap includes:

a pair of claw parts provided deformably in a radial direction of the cylindrical portion and insertable into the cylindrical portion to be engaged with an edge of the filling port;

a link piece connecting tip ends of the claw parts;

a disk part having an opening;

a closing plate capable of closing the opening of the disk part; and a fixing member which fixes the closing plate to the disk part, wherein the closing plate is fixed to the disk part with the fixing member and the claw parts are engaged with the edge of the filling opening, so that the opening of the cylindrical portion is closed by the closing plate, and the closing plate is detached from the disk part by detaching the fixing member, the link piece is pulled through the opening of the disk part to deform the claw parts radially inward to release engagement of the claw parts with the edge of the filling port, and then the cap is detached from the cylindrical portion, so that the container body and the cap can be reused.

2. The toner container according to claim 1, wherein the disk part has a pair of outwardly projecting pieces, and the closing plate has a pair of outwardly projecting pieces, and the fixing member is a pair of clips which holds the projecting pieces of the disk part and the projecting pieces of the closing plate so as to fix the closing plate to the disk part.

3. The toner container according to claim 1, wherein the claw parts can be engaged with a corner between the cylindrical portion and a side plate of the container body on which the cylindrical portion is provided.

4. The toner container according to claim 1, wherein the link piece is curved in a U-shape toward a base end side of the claw parts.

5. The toner container according to claim 1, wherein the cap has a pair of half-cylindrical portions provided between the pair of claw parts and insertable into the cylindrical portion.

6. The toner container according to claim 1, further comprising:

an O-ring provided between the disk part and the closing plate.

7. An image forming apparatus comprising:

the toner container according to claim 1; and an image forming part which forms an image using the toner supplied from the toner container.

* * * * *